(12) United States Patent
Fujisawa et al.

(10) Patent No.: US 7,502,542 B2
(45) Date of Patent: Mar. 10, 2009

(54) OPTICAL FIBER HOLDER, OPTICAL FIBER ADAPTER, AND OPTICAL FIBER PROCESSING DEVICE HAVING A POSITIONING MECHANISM

(75) Inventors: Manabu Fujisawa, Chiba (JP); Kenji Takahashi, Chiba (JP); Junichi Suzuki, Chiba (JP); Kenichiro Haruki, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/295,872

(22) Filed: Nov. 18, 2002

(65) Prior Publication Data

US 2003/0123836 A1 Jul. 3, 2003

(30) Foreign Application Priority Data

| Dec. 27, 2001 | (JP) | ............................. 2001-397008 |
| Mar. 6, 2002 | (JP) | ............................. 2002-060998 |
| Aug. 6, 2002 | (JP) | ............................. 2002-228934 |

(51) Int. Cl.
*G02B 6/36* (2006.01)

(52) U.S. Cl. ...................................... 385/134; 385/386
(58) Field of Classification Search .......... 385/134–137
See application file for complete search history.

(56) References Cited

U.S. PATENT DOCUMENTS 6,654,537 B2 * 11/2003 Wu et al. .................... 385/137
6,668,128 B2 * 12/2003 Hattori et al. ............... 385/136

FOREIGN PATENT DOCUMENTS

| CN | 1386207 A | 12/2002 |
| JP | 6-148454 | 5/1994 |
| JP | 9-113752 | 5/1997 |
| JP | H10-206282 | 8/1998 |
| JP | 11-142677 | 5/1999 |
| JP | H11-326646 | 11/1999 |
| JP | 2001-10884 | 1/2001 |
| JP | 2001-108841 | 4/2001 |
| JP | 2001-330749 | 11/2001 |

\* cited by examiner

*Primary Examiner*—Daniel St.Cyr
(74) *Attorney, Agent, or Firm*—Oblon, Spivak, McClelland, Maier & Neustadt, P.C.

(57) ABSTRACT

Guiding rails (22) are formed along both the edge portions of a back surface (21) of an optical fiber holder (20), which guide positioning protrusions (12) formed on a mounting surface (110) in an optical fiber processing device (10). The interval between inner-wall surfaces (23) of the guiding rails (22) opposed to each other corresponds to the interval between the positioning protrusions (12). Hollow portions (24) are formed at the back surface (21) of the holder (20), into which the positioning protrusions (12) are inserted. The holder (20) is tightly fixed on the mounting surface (11) of the device (10).

15 Claims, 16 Drawing Sheets

FIG.8
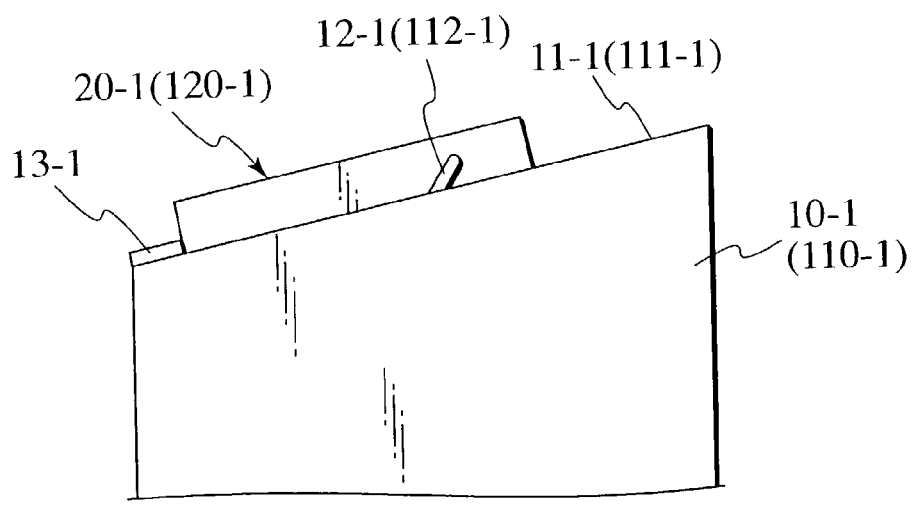
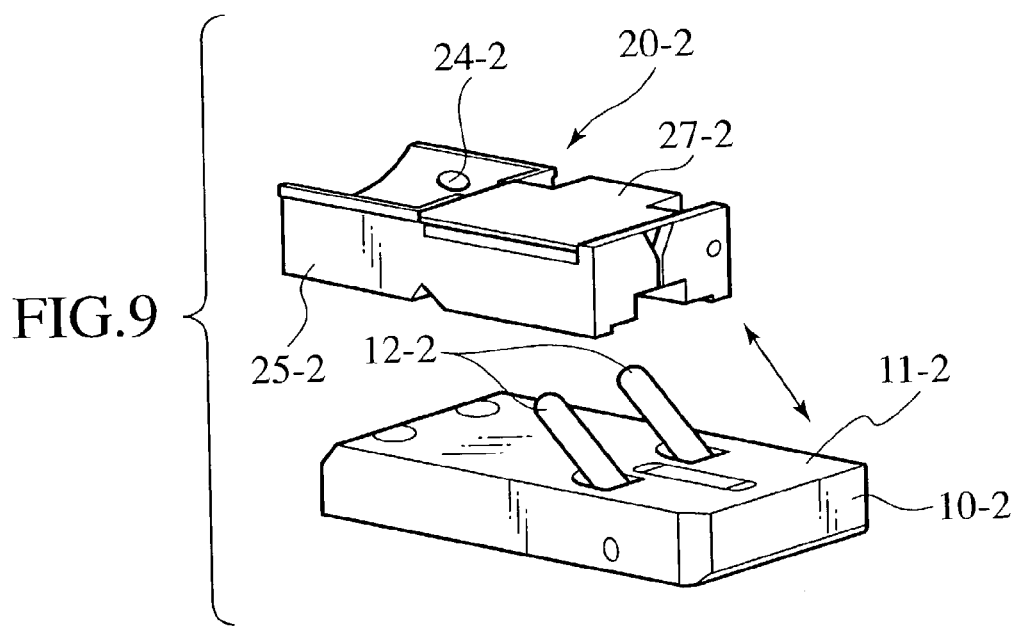
FIG.9

PRIOR ART

PRIOR ART

FORTH/BACK

LEFT/RIGHT

FIG.26A  FIG.26B
PRIOR ART
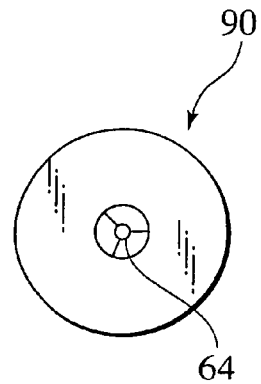
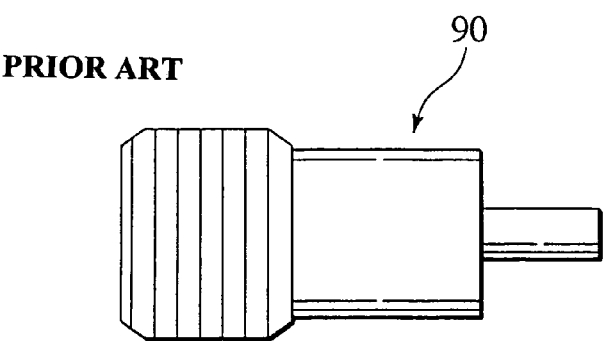
PRIOR ART
FIG.27A  FIG.27B
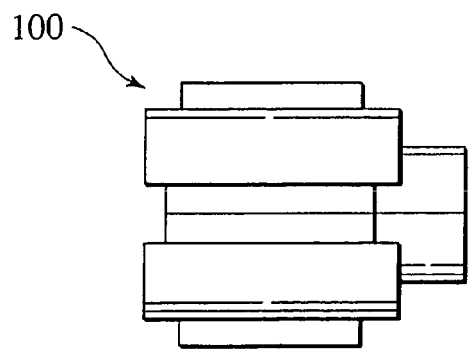
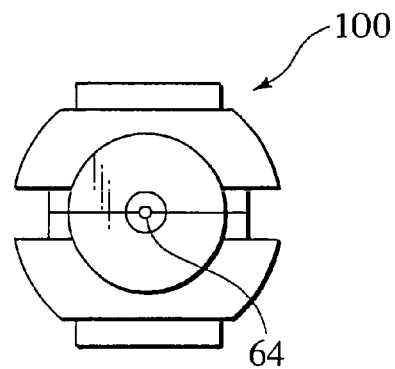

OPTICAL FIBER HOLDER, OPTICAL FIBER ADAPTER, AND OPTICAL FIBER PROCESSING DEVICE HAVING A POSITIONING MECHANISM

CROSS-REFERENCE TO RELATED APPLICATION

This application is based upon and claims the benefit of priority from the prior Japanese Patent Applications No. P2001-397008, filed Dec. 27, 2001, No. P2002-060998, filed Mar. 6, 2002, and No. P2002-228934, filed Aug. 6, 2002; the entire contents of which are incorporated herein by reference.

BACKGROUND OF THE INVENTION

1. Field of the Invention

The present invention relates to an optical fiber holder, an optical fiber adaptor, and an optical fiber processing device having a positioning mechanism. In particular, the invention relates to an optical fiber holder having a positioning mechanism for holding an optical fiber or an optical fiber ribbon and easily and precisely setting in an optical fiber adaptor in an optical fiber processing device while holding the optical fiber therein. The invention further relates to an optical fiber adaptor having a positioning mechanism holding the optical fiber holder in the optical fiber processing device, and to an optical fiber processing device having a positioning mechanism.

2. Description of the Related Art

In general, an optical fiber holder is mounted onto an optical fiber processing device in following various processes: the tip end of an optical fiber is cleaved and polished; the tip end of an optical fiber is optically coupled to a light source or a power meter; and the tip ends of optical fibers are fused and spliced to each other.

Such an optical fiber holder holds the tip portion and a portion close to the tip portion of an optical fiber or an optical fiber ribbon made up of a plurality of optical fibers (hereinafter, referred to as "an optical fiber" in some cases). The entire optical fiber holder is positioned and then fixed at a predetermined position on the mounting surface of an optical fiber processing device, and various processes for the optical fiber.

As conventional positioning mechanisms in optical fiber holders for use in conventional optical fiber processing devices, the following techniques (1), (2), and (3) are well known, in addition to the positioning mechanism where the optical fiber holder is directly mounted and fixed onto an optical fiber processing device at a predetermined position:

(1) Japanese patent laid-open publication number JP-A-H6-148454;

(2) Japanese patent laid-open publication number JP-A-2001-108841; and (3) Japanese patent laid-open publication number JP-A-H11-142677.

In the positioning mechanisms disclosed in techniques (1) and (2) the optical fiber holder is detachably mounted at a predetermined position in the optical fiber processing device through a force caused by a magnet.

Further, in the positioning mechanism disclosed in the technique (3) the optical fiber holder is detachably held and fixed by a fixing means mounted at a predetermined position in the optical fiber processing device.

However, as further explained below, problems (a), (b), and (c) exist when conventional optical fiber holders are mounted on conventional optical fiber processing devices, for example, in an optical fiber fusion splicer using the conventional optical fiber holder.

(a) There is a possibility that the following cases will make flaws (or scratches) on a surface or on a cleaved plane of the optical fiber: The side face of the optical fiber clashes or is impacted carelessly to component parts such as V-groove edges, an optical fiber clamp mechanism, a lens for observing the optical fiber, mechanism parts accompanied with this lens, and arc discharging electrode rods for use in a fusion splicing process. Because there is no guiding mechanism in the conventional optical fiber processing device for guiding the optical fiber holder, the optical fiber holder is shifted forward and backward when this holder is mounted on the mounting surface of the optical fiber processing device while clamping the optical fiber. As a result, there is a problem in which the flaw occurs in the optical fiber and the flaw causes to decrease a tensile strength of an optical fiber cable and to thereby increase a splice loss between the optical fibers.

(b) In the process in which an optical fiber is mounted in a V-groove formed in a fusion splicer and shifted to a desired position on the V-groove in order to splice the optical fibers together, there is a problem in which fine dusts are attached to the tip of or the cleaved surface of the optical fiber. Thereby, the splice loss between the optical fibers becomes high.

(c) When the optical fiber holder is mounted on the optical fiber processing device, it is necessary for an expert (skilled) operator to handle the optical fiber holder in order to set it onto the optical fiber processing device so that any part of the optical fiber projected from the tip portion of the optical fiber holder is not touched to various mechanical components around the mounting surface of the optical fiber processing device.

By the way, there are many kinds of available terminal processing devices as optical fiber preparation tools, for example, a jacket stripper, an ultrasonic cleaner, a cleaver, a fusion splicer, and the like (hereinafter, referred to as "optical fiber processing devices"). The jacket stripper strips a coating material from an optical fiber. The ultrasonic cleaner performs the cleaning of a bare fiber after the coating material is stripped from the optical fiber. The cleaver cleaves the end portion of the optical fiber. The fusion splicer fuses the optical fibers and then splices the end surfaces of both the optical fibers.

When an optical fiber is mounted on an optical fiber processing device, or when the end portion of the optical fiber is set to a measuring device such as a power meter, the optical fiber is firstly set in an optical fiber holder, and the optical fiber holder is then mounted in the optical fiber processing device.

FIG. 23 is a front view showing a configuration of a conventional optical fiber holder for holding the end portion of an optical fiber.

The conventional optical fiber holder 60 comprises a hinge pin 61, upper and lower clamping portions 62U and 62L capable of opening and closing through the hinge pin 61, and elastic materials 63U and 63L like a rubber plate corresponding to opposed surfaces of the clamping portions 62U and 62L. Between the elastic materials 63U and 63L, the optical fiber 64 is clamped. A clamping force of an approximate constant value to clamp the optical fiber 64 is given by a magnet (not shown) or a spring (also not shown).

In the holding state where the conventional optical fiber holder 60 having the above configuration holds the end portion of the optical fiber 64, when the optical fiber is set in the optical fiber cleaver in order to cleave the optical fiber in a predetermined lead length (the length of a bare fiber where the coating material has been detached), an operator sets the optical fiber in the optical fiber cleaver while positioning the end portion of the optical fiber at a graduation marked on the optical fiber cleaver. In this case, because the size of the optical fiber is so fine that it is necessary for a skilled operator to handle this positioning operation.

Further, when optical fibers are set in an optical fiber fusion splicer for performing a fusion splicing process, a coating material portion in each optical fiber is mounted on a V-groove for positioning in a fusion splicing portion in the device. This operation causes that the ends of the optical fibers are not reached to a discharging area in the fusion splicing portion by an inclination of the optical fibers or by the error of the positioning. Furthermore, there are various problems that flaws (or scratches) occurs on an end surface or a surrounding surface of the optical fiber by clashing the end surface and surrounding surface of the optical fiber with component parts such as V-groove edges and the like, and that fine dusts are attached to the end surface of the optical fiber by sliding the optical fiber on the V-groove.

FIG. 24 is a diagram showing a conventional optical fiber holder having another configuration.

An optical fiber holder 70 shown in FIG. 24 comprises a base plate 72 having a V-groove 71 for fixing the optical fiber 64 and a clamp 74 capable of opening and closing through the hinge pin 73. The optical fiber holder 70 further comprises an elastic material 75 formed on the clamping surface of the clamp 74 and a concave-shaped groove 76 formed under the base plate 72 that is detachably engaged with a positioning convex portion 81 formed on a mounting base 80 (see FIG. 25A and FIG. 25B) in the optical fiber processing device.

In the conventional optical fiber holder 70 having the configuration described above it is necessary to mount a strong magnet in the optical fiber holder 70 or in the mounting base 80 in order to fix the optical fiber holder 70 onto the mounting base 80. Or, as shown in FIG. 25A and FIG. 25B, it is necessary to equip a fixing mechanism 82 of a kind of a toggle link mechanism with the mounting base 80. Therefore the conventional optical fiber holder has a problem that the working efficiency to mount the optical fiber holder 70 on the mounting base 80 and to release it from the mounting base 80 becomes low.

Moreover, when the concave portion 76 formed in the base plate 72 is engaged with the positioning convex portion 81 on the mounting base 80, although it is possible to perform the positioning in the direction perpendicular to the longitudinal direction of the optical fiber holder 70, it is difficult to perform the precision positioning in the longitudinal direction of the optical fiber holder 70.

For example, an error operation occurs because the tip portions of optical fibers to be spliced together is not reached within the arc-discharge area when the optical fiber holder is set in the fusion splicer.

Further, for example, in order to avoid any occurrence of drop of an optical fiber from the optical fiber cleaner it is necessary to equip a fixing mechanism such as a magnet and the like for fixing the optical fiber when the tip portion of the optical fiber is cleaned while the tip portion of the optical fiber is fixed in vertical direction.

Moreover, there are many types of conventional adaptors, as shown in FIG. 26A and FIG. 26B, and FIG. 27A and FIG. 27B, for use in various measurement devices such as a power meter and the like. FIG. 26A and FIG. 26B show the adaptor 90 in which the optical fiber 64 is inserted in a small hole therein. The adaptor 100 shown in FIG. 27A and FIG. 27B has two divided portions in which the optical fiber 64 is held between them.

The adaptor 90 (see FIG. 26A and FIG. 26B) of the optical fiber insertion type has a drawback in which fine dusts are attached to the tip surface of the optical fiber 64 by contacting the tip surface of the optical fiber 64 to surrounding portions when the optical fiber 64 is inserted into a fine hole.

The adaptor 100 (see FIG. 27A and FIG. 27B) of the division type in which the optical fiber is held between the two divided-body portions has the drawback where in some cases the optical fiber is broken when the optical fiber is not set precisely in a predetermined portion.

SUMMARY OF THE INVENTION

Accordingly, an object of the present invention is, with due consideration to the drawbacks of the conventional technique, to provide an optical fiber holder, an optical fiber adaptor, and an optical fiber processing device having a positioning mechanism by which an optical fiber or an optical fiber ribbon is easily held in the optical fiber holder, and the optical fiber holder is easily set into the optical fiber adaptor, and the optical fiber holder and the optical fiber adaptor can be mounted easily and precisely onto the mounting surface of the optical fiber processing device without contacting them to the optical fiber processing device and any surrounding portions thereof.

Hence, there is a provided according to an aspect of the present invention, an optical fiber holder for clamping an optical fiber comprising one or more hole portions, into which positioning protrusions formed on a mounting surface of an optical fiber processing device are inserted.

According to a further feature of the present invention, the optical fiber holder further has one or more guiding rails for guiding the positioning protrusions formed on the mounting surface of the optical fiber processing device.

According to a further feature of the present invention, the optical fiber holder further has a base body in which at least one of a V-groove for placing one optical fiber and a groove for placing an optical fiber ribbon made up of a plurality of optical fibers, and a push plate for pushing the optical fiber and the optical fiber ribbon, which is freely open and closed.

According to a still further feature of the present invention, the base body has a magnet for clamping the optical fiber, and the push plate comprises a magnetic material formed at a position corresponding to the magnet in the base body. In the optical fiber holder above, the push plate and the base body are magnetically attracted to each other when the push plate is closed in order to clamp the optical fiber.

According to a yet still further feature of the present invention, in order to protect the optical fiber, a rubber plate is formed on a part of the push plate, to which the optical fiber is contacted.

According to a yet still further feature of the present invention, the guiding rails are projection portions formed at both edge portions of the back surface of the optical fiber holder.

According to a yet still further feature of the present invention, the hole portions are formed at positions between the guiding rails.

According to a yet still further feature of the present invention, the hole portion is one of a through hole and a hollow portion.

According to a yet still further feature of the present invention, the number of the hole portions correspond to the number of the positioning protrusions.

According to a yet still further feature of the present invention, a slope of the hole portion against the surface of the optical fiber holder is in a range of 30 to 90 angles, and the hole portions are formed according to the slope of the positioning protrusions formed on the mounting surface of the optical fiber processing device.

According to a yet still further feature of the present invention, a plurality of the push plates are formed.

There is also provided according to another aspect of the present invention, an optical fiber processing device on which an optical fiber holder clamping an optical fiber is mounted for processing the optical fiber, comprising a mounting surface on which positioning protrusions are formed. In the optical fiber processing device, the positioning protrusions correspond in position to the hole portions formed in the optical fiber holder according to the present invention.

According to a further feature of the present invention, the optical fiber processing device further has guiding rails for guiding both edge portions of the optical fiber holder according to the present invention.

According to a still further feature of the present invention, the optical fiber processing device further has a stopper for stopping the front end portion of the optical fiber holder according to the present invention when it is mounted.

There is also provided according to another aspect of the present invention, an optical fiber holder for clamping an optical fiber and mounted on a mounting surface of an optical fiber processing device, having positioning protrusions that are formed on the optical fiber holder corresponding in position to positioning hole portions formed in the mounting surface of the optical fiber processing device.

There is also provided according to another aspect of the present invention, an optical fiber processing device for processing an optical fiber, having hole portions corresponding in position to the positioning protrusions formed on the optical fiber holder according to the present invention. In the optical fiber processing device, the positioning protrusions are inserted into the hole portions in order to fix the optical fiber holder clamping the optical fiber onto a mounting surface of the optical fiber processing device.

There is also provided according to another aspect of the present invention, an optical fiber adaptor for detachably containing an optical fiber holder clamping an optical fiber, having a containing portion, an insertion portion, and positioning pins. The containing portion is detachably containing the optical fiber holder, a groove at which a tip portion of the optical fiber is clamped. The insertion portion is inserted into an measuring device. The positioning pins, formed on the containing portion, are freely engaged with positioning hole portions formed in the optical fiber holder and corresponding in position to the positioning hole portions.

The above and other features and advantages of this invention and the manner of realizing them will become more apparent, and the invention itself will best be understood, from a study of the following description and attached claims, with reference had to the attached drawings showing some preferable embodiments of the invention.

BRIEF DESCRIPTION OF THE DRAWINGS

FIG. 8 is a plan view showing a state in which the optical fiber holder shown in FIG. 7 is mounted on the mounting surface of the optical fiber processing device;

FIG. 9 is a perspective view showing the mounting surface having inclined positioning protrusions;

FIG. 26A and FIG. 26B are diagrams showing a configuration of a conventional adaptor; and FIG. 27A and FIG. 27B are diagrams showing a configuration of a conventional adaptor.

DESCRIPTION OF THE PREFERRED EMBODIMENTS

Other features of this invention will become apparent through the following description of preferred embodiments that are given for illustration of the invention and are not intended to be limiting thereof.

Hereinafter, a description will be given of the detailed explanation of optical fiber holders having a positioning mechanism, optical fiber adaptors having a positioning mechanism, and optical fiber processing devices having a positioning mechanism according to the present invention with reference to diagrams. The following explanation shows the cases in which the optical fiber holder of the present invention is mounted on various terminal processing devices such as an optical fiber fusion splicer, a high strength jacket stripper, a high strength cleaver, an ultrasonic cleaner and the like. However, the present invention is not limited by this configuration, for example, the optical fiber holder of the present invention can be applied to the optical fiber processing devices of various types.

First Embodiment

Figure 1:
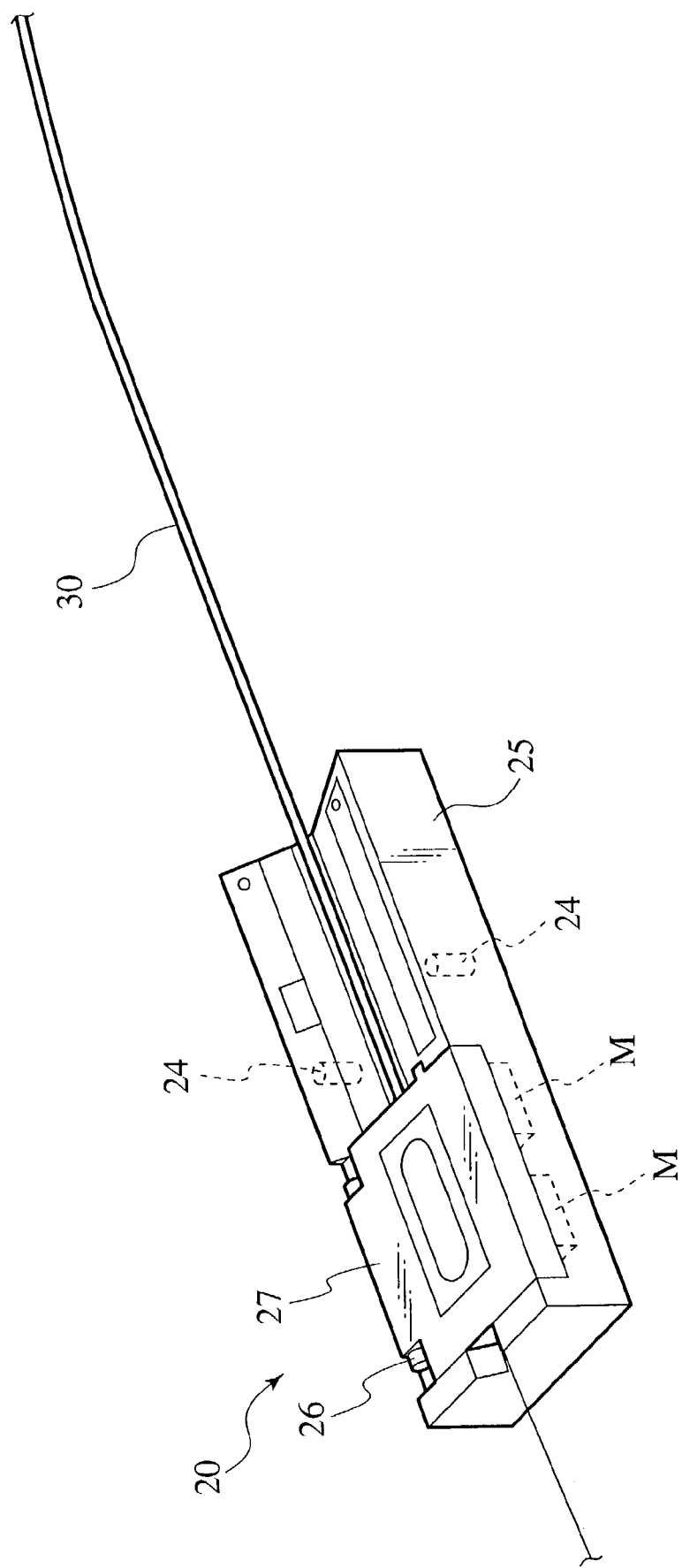
FIG. 1 is a perspective view of an optical fiber holder according to a first embodiment of the present invention.
Figure 2:
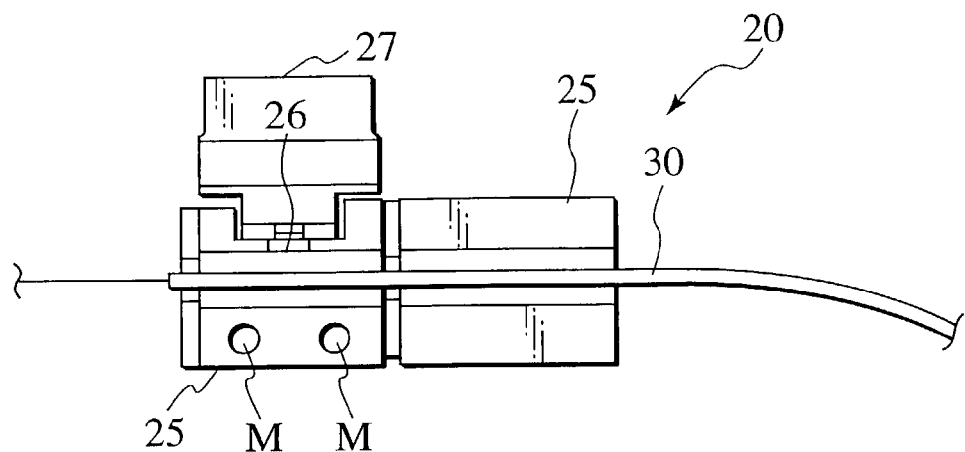
FIG. 2 is a plan view of the optical fiber holder according to the first embodiment.
Figure 3:
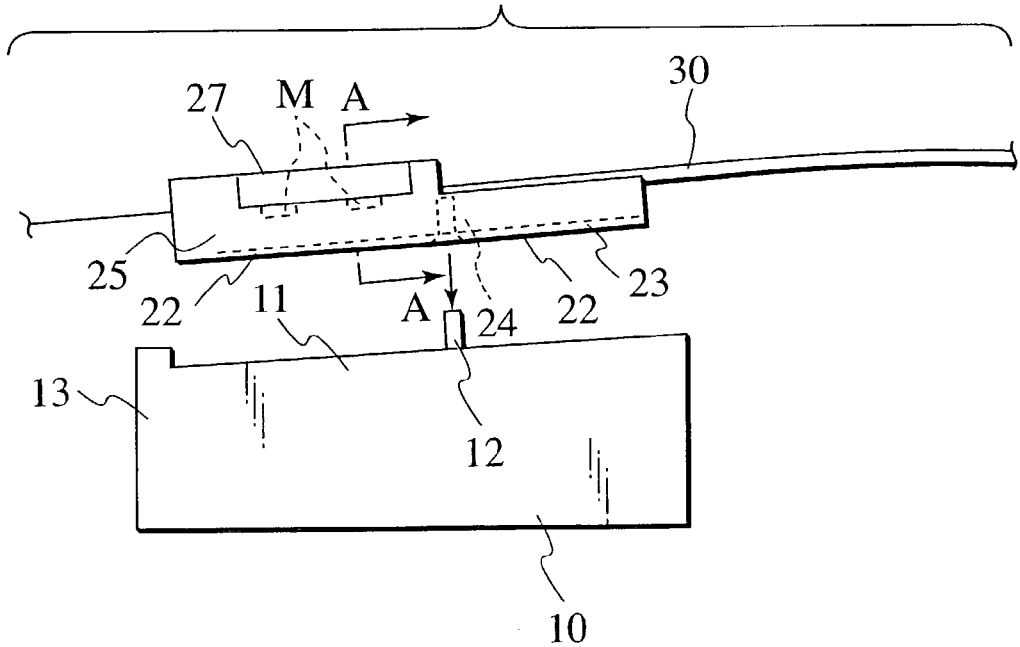
FIG. 3 is a front view showing a state in which an operator sets the optical fiber holder of the first embodiment onto a mounting surface of the optical fiber processing device.
Figure 4:
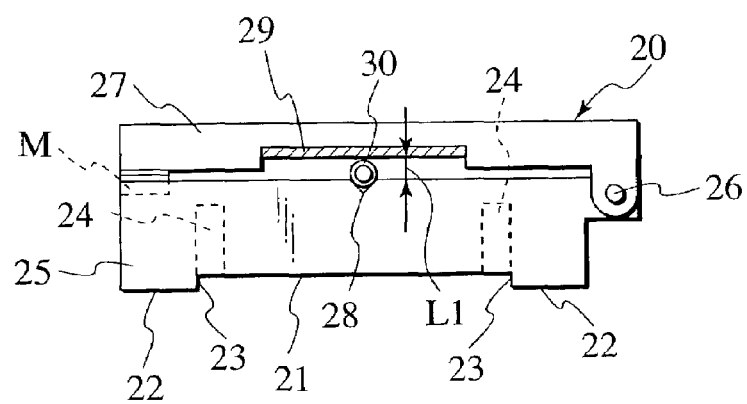
FIG. 4 is an enlarged sectional view of A-A line in the optical fiber holder shown in FIG. 3.
Figure 5:
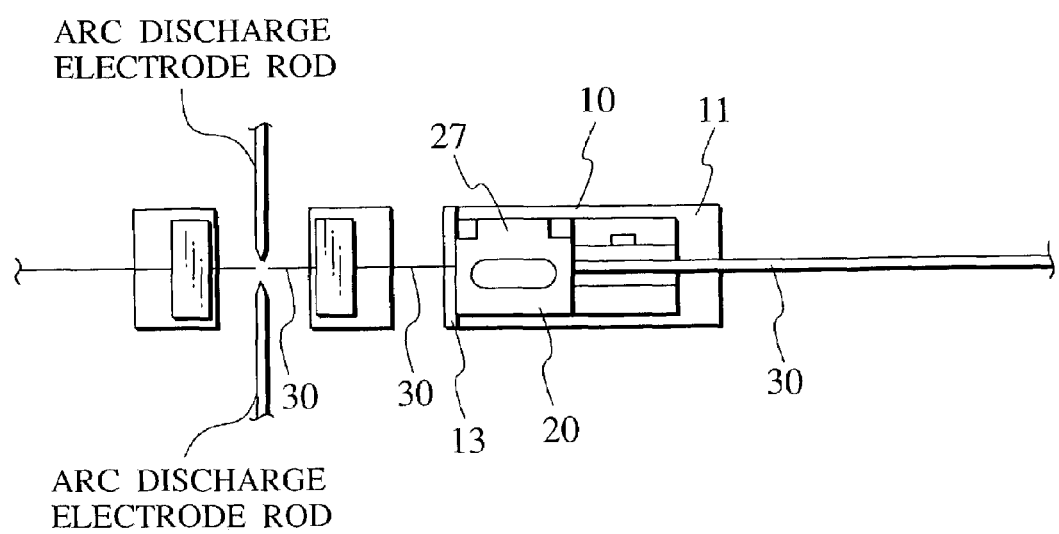
FIG. 5 is a plan view showing a state in which the optical fiber holder of the first embodiment is mounted in the optical fiber processing device.

FIG. 1 is a perspective view of the optical fiber holder according to the first embodiment of the present invention. FIG. 2 is a plan view of the optical fiber holder according to the first embodiment. FIG. 3 is a front view showing a state in which an operator sets the optical fiber holder onto a mounting surface of the optical fiber processing device. FIG. 4 is an enlarged sectional view of A-A line in the optical fiber holder shown in FIG. 3. FIG. 5 is a plan view showing a state in which the optical fiber holder is mounted on the optical fiber processing device.

The optical fiber holder 20 according to the first embodiment shown in FIG. 1 to FIG. 5 comprises a base block 25 and a push plate 27. The entire shape of the base block 25 is nearly a rectangular shape. The push plate 27 is freely open and closed against the front surface of the base block 25 through a hinge pin 26 and pushes the surface of the base block 25.

A part or the entire of this push plate 27 comprises a magnetic material and fixed to the base block 25 through the hinge pin 26 and the push plate 27 is opened and closed freely through this hinge pin 26. Furthermore, a pair of magnets M (see FIG. 1 to FIG. 4) are embedded in the base block 25 and the surface of each magnet M is exposed. Accordingly, when the push plate 27 is closed, the inner surface of the push plate 27 is magnetically attracted to the magnets M in the base block 25.

On the surface of the base block 25, a fine V-groove 28 is formed. On the V groove 28, an optical fiber to be processed by the optical fiber processing device is set.

As shown in FIG. 2 to FIG. 4, a pair of the magnets M are embedded in the surfaces of the edge portions of the base block 25 and the surface of each magnet M is exposed. A pair of the magnets M are arranged at the corresponding in position to the magnetic material in the push plate 27 when closed. Accordingly, when the optical fiber 30 is mounted in the V-groove 28 and the push plate 27 is closed, the optical fiber 30 is held by magnetically attracting the magnets M in the base block 25 to the back surface of the push plate 27. In order to protect the optical fiber 30 when the push plate 27 is closed, a rubber sheet 29 is placed at the inside of the push plate 27.

As shown in FIG. 4, guiding rails 22 of a convex shape are formed at both the edge portions of the base block 25 in its longitudinal direction in the back surface (or bottom surface) 21 of the base block 25 forming the optical fiber holder 20. Through the guiding rails 22, the positioning protrusions (or positioning pins) 12 (explained later in detail) are guided. The positioning protrusions 12 are formed on the mounting surface 11 of the optical fiber processing device 10.

In this back surface 21 of the base block 25 a pair of hollow portions 24 (or through holes are also acceptable instead of the hollow portions) are formed corresponding to a pair of the positioning protrusions 12. The entry portion of each hollow portion 24 is a taper shape for easily guiding the corresponding protrusion 12 (see FIG. 3).

Figure 6:
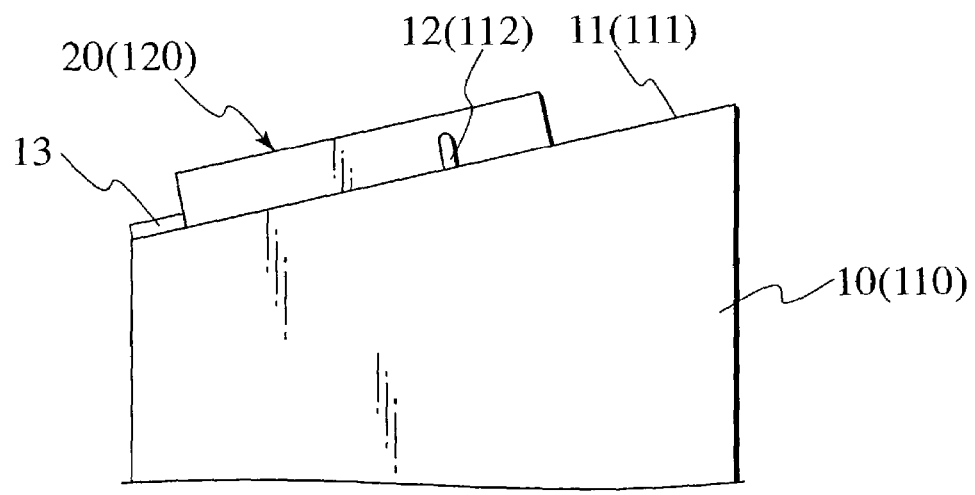
FIG. 6 is a plan view showing a state in which the optical fiber holder of the first embodiment is mounted on the mounting surface of the optical fiber processing device.

On the other hand, on the mounting surface of the optical fiber processing device on which the optical fiber holder 20 is mounted, a pair of the positioning protrusions 12 are formed. A pair of the positioning protrusions 12 correspond in position to a pair of the hollow portions 24 (see FIG. 3 and FIG. 6).

The interval between a pair of the positioning protrusions 12 corresponds to the interval between the inner sidewalls 23 of the guiding rails 22 in the optical fiber holder 20. Further, the positioning protrusions 12 correspond in position to the hollow portions 24. The positioning protrusions 12 are formed in a symmetric position to the centerline of the base block 25 in its longitudinal direction.

When the optical fiber holder 20 is mounted in the mounting surface 11 of the optical fiber processing device 10, a pair of the positioning protrusions 12 are contacted and pushed to the inner sidewalls 23 in the guiding rails 22 opposed to each other, the optical fiber holder 20 is shifted along the inner sidewalls 23, and the positioning protrusions 12 are thereby completely inserted into the corresponding hollow portions 24.

When the positioning protrusions 12 are inserted into the hollow portions 23 completely, the optical fiber holder 20 are tightly fixed at the predetermined position on the mounting surface 11 of the optical fiber processing device 10. In FIG. 3, reference number 13 designates a stopper for stopping the tip portion of the optical fiber holder 20.

By this manner described above, the optical fiber holder 20 is detachably mounted onto the optical fiber processing device for processing the tip portion of the optical fiber 30.

At the upper surface of the optical fiber holder 20 the V-groove 28 is formed in strait line for holding the optical fiber 30.

In the optical fiber holder 20 the push plate (clamp) 27 is formed, which is freely open and closed. Through the push plate 27, the optical fiber 30 is fixed and held in the V-groove (see FIG. 4) as the optical fiber setting portion. The clamping force of the push plate 27 is obtained by the mechanism using the magnets or springs, like the conventional optical fiber holder.

Further, in the base block 25 of the optical fiber holder 20 the positioning hollow sections 24 are formed corresponding to the positioning protrusions 12 formed in the mounting surface of the optical fiber device.

Figure 11:
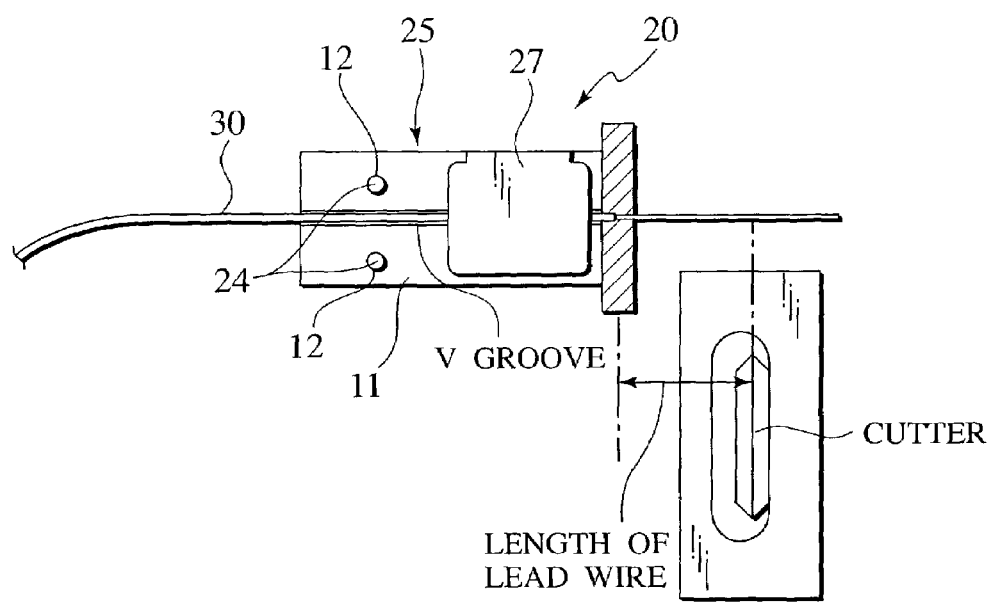
FIG. 11 is a diagram showing an explanation of the state in which the optical fiber holder is mounted on an optical fiber cleaver.

As shown in FIG. 1 and FIG. 11 (described later), it is desirable that the hollow portions (or through holes) 23 are separated in position to each other along the V-groove formed in the base block 25 as separately as possible. However, it is not limited by this configuration, for example, it is possible to separately form the hollow portions 24 for use in the positioning along the direction of the V-groove. As described above, by the hollow portions 24 for positioning are formed as separately as possible, it is possible to prevent that the optical fiber holder 20 is finely turned about the positioning protrusions 12. This increases the positioning precision when the optical fiber holder is set in the optical fiber processing device.

Figure 7:
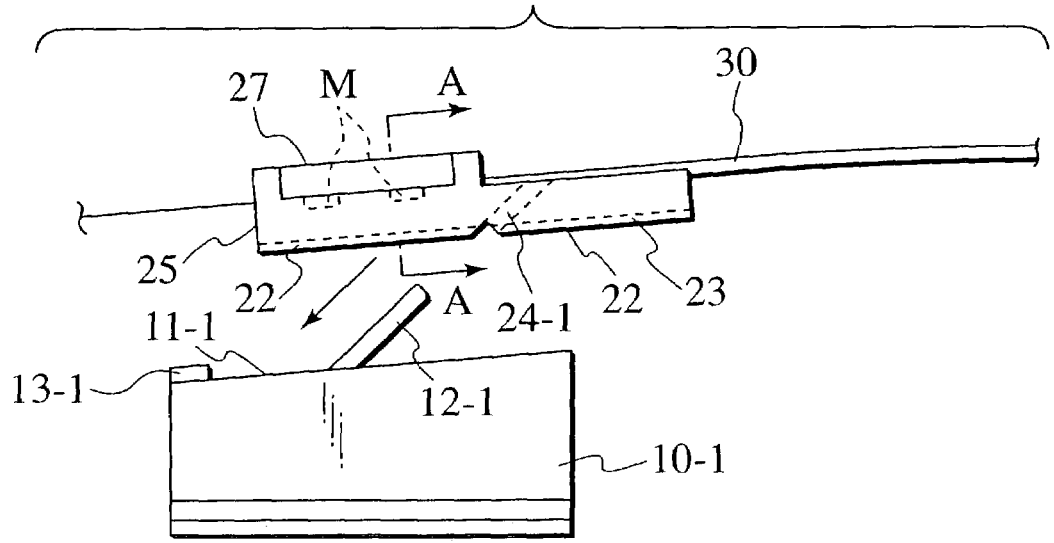
FIG. 7 is a plan view showing a state in which an operator sets the optical fiber holder having another configuration onto the mounting surface of the optical fiber processing device.

For example, as shown in FIG. 7 and FIG. 8, when the mounting surface 11-1 of the optical fiber processing device 10-1 has a slope of a predetermined angle, the positioning protrusions 12-1 are formed so that they have the same slope according to the slope of the mounting surface 11-1 and the hollow portions of the optical fiber holder has the same slope described above.

In addition, as shown in FIG. 9, the positioning protrusions 12-2 have the slope of the predetermined angle to the mounting surface 11-2, the positioning hollow portions (or through holes) of the optical fiber holder are formed so that they have the same slope. In FIG. 9, because the positioning holes 24-2 formed in the base block 25-2 of the optical fiber holder 20-2 have the same slope, like the positioning protrusions (pins) 12-2, the attaching and detaching of the optical fiber holder 20-2 to the mounting base 10-2 can be performed along the slope of the positioning protrusions 12-2 correctly.

By the configuration described above, it is possible to easily mount and demount the optical fiber holders 20-1 and 20-2.

It is desirable that the slope angle against the mounting surfaces 11, 11-1, and 11-2 shown in FIG. 7 to FIG. 9 is in a range of 30 to 90 angles.

By the way, in the above explanation although the sectional shape of the tip portion of the positioning protrusions 12 has a circular rod, the present invention is not limited by this configuration. For example, it is possible for the positioning protrusions 12 to have an elliptic shape and a rectangle sectional shape, or a taper shape. Thus, it is possible to use various shapes for the positioning protrusions and the positioning hollow portions. As shown in FIG. 10A to FIG. 10F, following shapes can be used, for example.

Figure 10A:
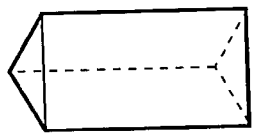
FIG. 10A to FIG. 10G show various positioning protrusions (or pins) of different shaped formed on the optical fiber holders according to the present invention or formed on each mounting surface of the optical fiber processing devices according to the present invention.
Figure 10B:
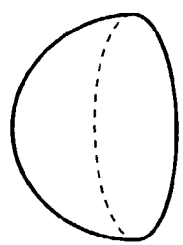
Figure 10C:
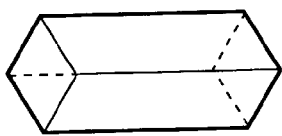
Figure 10D:
Figure 10E:
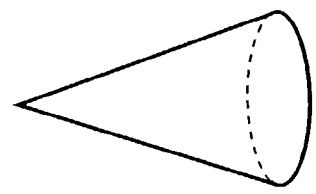
Figure 10F:
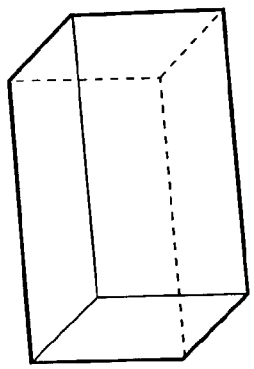
Figure 10G:
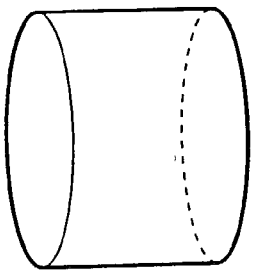

The tip of the positioning protrusion (pin) has a hemispherical shape (see FIG. 10A) or a plane shape (see FIG. 10B). The entire of the tip of the positioning protrusion (pin) has a hemispherical shape (see FIG. 10C) or a triangle pole shape (see FIG. 10D). The sectional shape of the tip of the positioning protrusion has an ellipsoid shape (see FIG. 10E) or a rectangular column shape (see FIG. 10F), or it has a triangular pyramid shape (see FIG. 10G).

By the way, the present invention is not limited by the above configuration in which the number of the hollow portions (or through holes) 24 corresponding to the positioning protrusions 12 is a pair. For example, it is acceptable that the number thereof is one, or an optional number of more than two. However, in the case that the number is one it is necessary for the sectional shape of the positioning protrusion to have the ellipsoid shape (see FIG. 10E) or the rectangular column shape (see FIG. 10F).

FIG. 11 to FIG. 13 and FIG. 15 to FIG. 18 show various shapes of the positioning protrusions (pins) formed on the mounting surface of the optical fiber processing devices.

FIG. 11 is a diagram schematically showing the configuration in which the optical fiber holder 20 is mounted on an optical fiber cleaver for cleaving the end portion of the optical fiber 30.

In this configuration, the positioning is performed by inserting the positioning protrusions (positioning pins) 24 formed at the predetermined position from the cleaver for cleaving the end portion of the optical fiber 30 into the hollow portions (positioning holes) 24.

Therefore the optical fiber holder 20 can be fixed to the cleaver at the same position in X axis and Y axis directions (right and left directions and upward and downward directions in FIG. 11). Further, the fine rotation of the optical fiber holder 20 about the Z axis (the vertical axis of this paper) can be prevented.

Accordingly, when the positioning protrusions 12 are inserted into the positioning hollow portions 24 of the optical fiber holder 20 which holds the optical fiber 30 at the accurate position, the same positioning for the cleaver can be performed, so that the length of the lead wire of the optical fiber 30 becomes always the same length after the cleaving.

Figure 12:
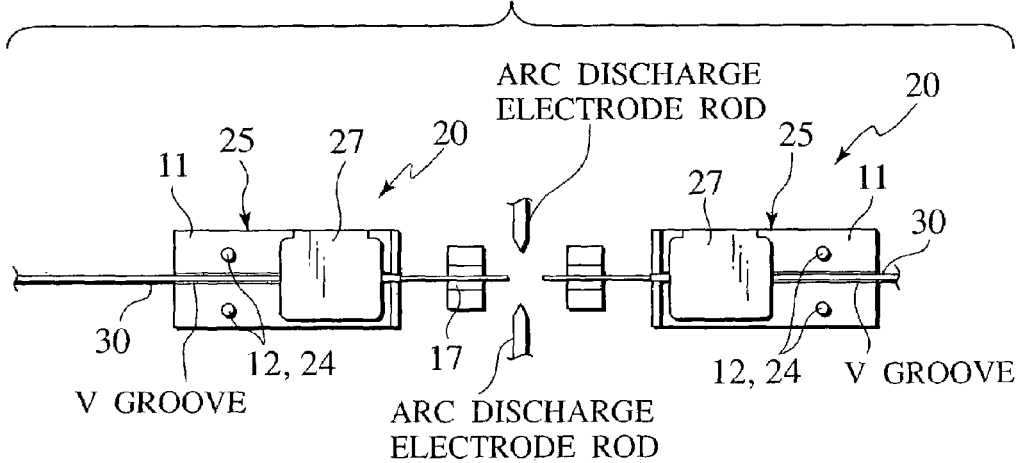
FIG. 12 is a diagram showing an explanation of the state in which the optical fiber holder is mounted on an optical fiber fusion splicer.

In addition, as shown in FIG. 12, when the optical fiber holder 20 is mounted on the optical fiber fusion splicer for fusing and splicing the end-surface portions of the optical fibers 30 to be spliced together, the position of the positioning pins 12 formed in the optical fiber fusion splicer device has same and the length of the lead wire from the optical fiber holder 20 to the optical fibers 30 is also same. Thereby, the positioning of the optical fiber in the V-groove of the optical fiber fusion splicer can be performed correctly and easily. Further, it is also possible to perform the positioning of the end portions of the optical fibers against the discharge area generated between the arc discharge electrode rods that are placed in opposition position.

Accordingly, when the fusion splicing process for the end portions of the optical fibers is performed, the fusion splicing process can be always performed accurately regardless of a technical skill of the operator.

Figure 13:
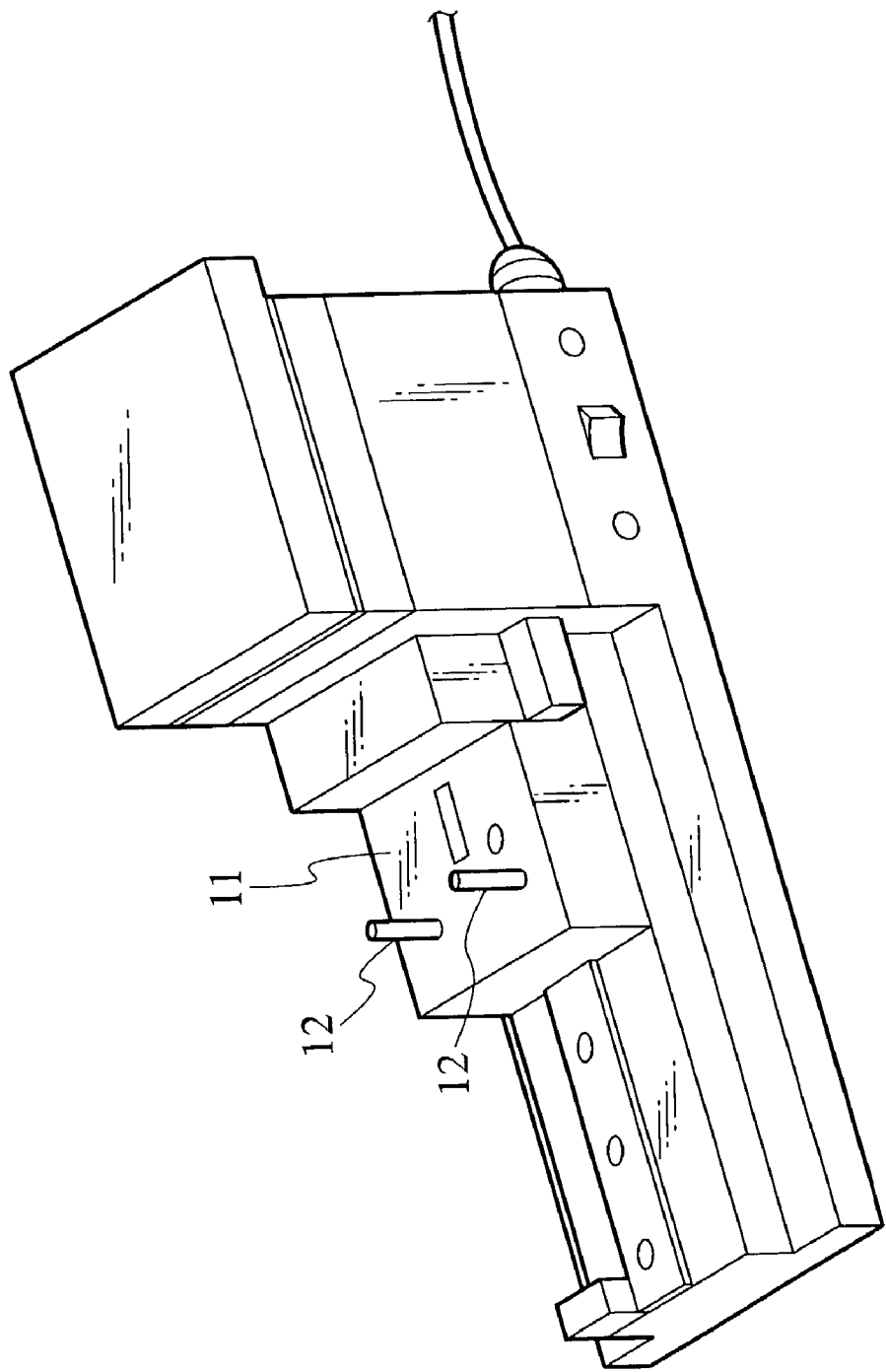
FIG. 13 is a diagram showing a high strength jacket stripper having a mounting surface having positioning protrusions.

FIG. 13 is a perspective view showing a high strength jacket stripper for stripping a coating material from the optical fiber. In FIG. 13, a pair of positioning protrusions 12 are formed on the mounting surface 11.

Figure 14:
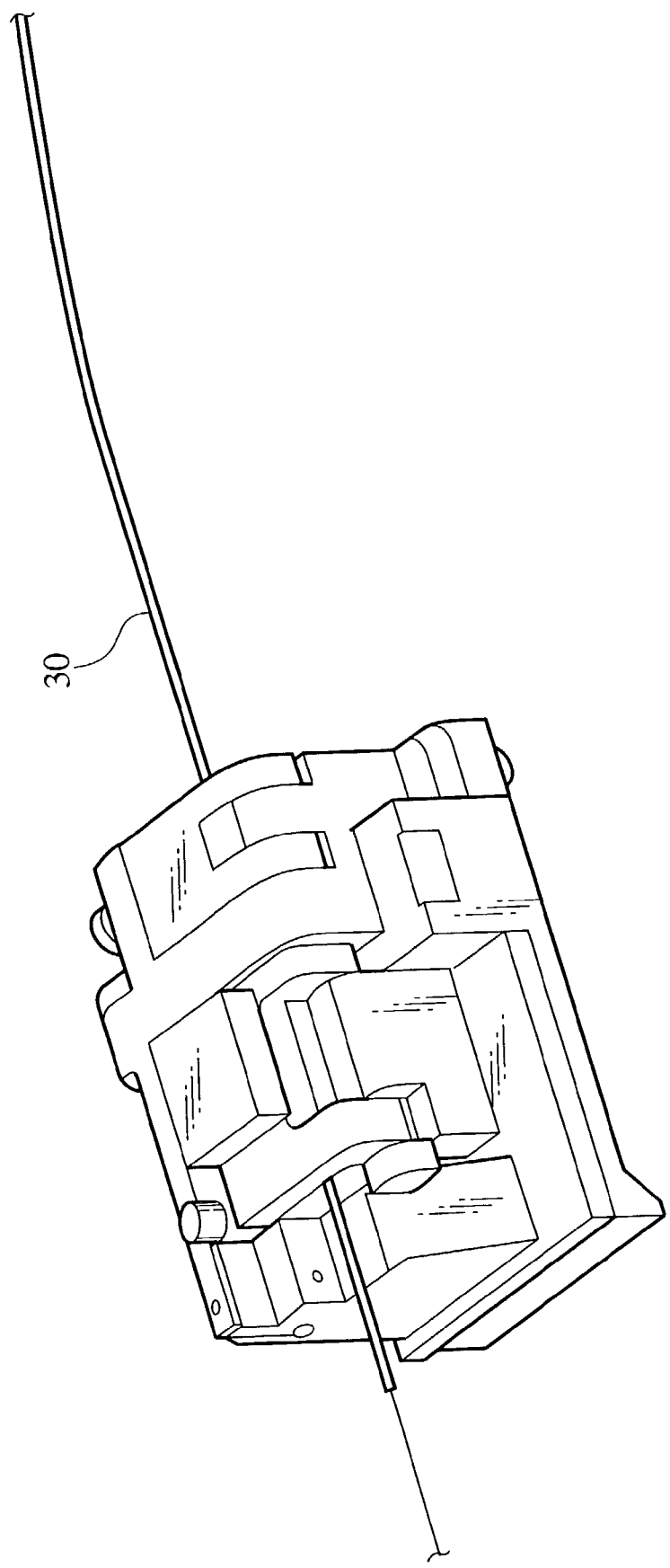
FIG. 14 is a perspective view showing a state of a high strength cleaver device in which the optical fiber holder is set.

FIG. 14 is a perspective view showing a high strength cleaver device for performing a pre-treatment process for the optical fiber. In FIG. 14, the optical fiber holder is mounted in the high strength cleaver device and covered by the push plate (Therefore, the positioning protrusions and the optical fiber holder are not shown).

Figure 15A:
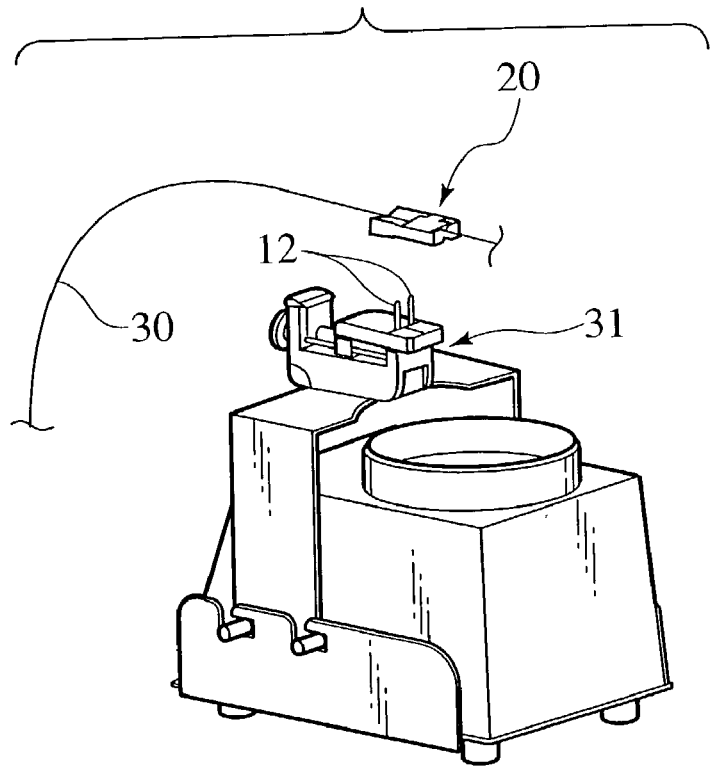
FIG. 15A and FIG. 15B are perspective views showing a state of an ultrasonic cleaner device in which the optical fiber holder is set.
Figure 15B:
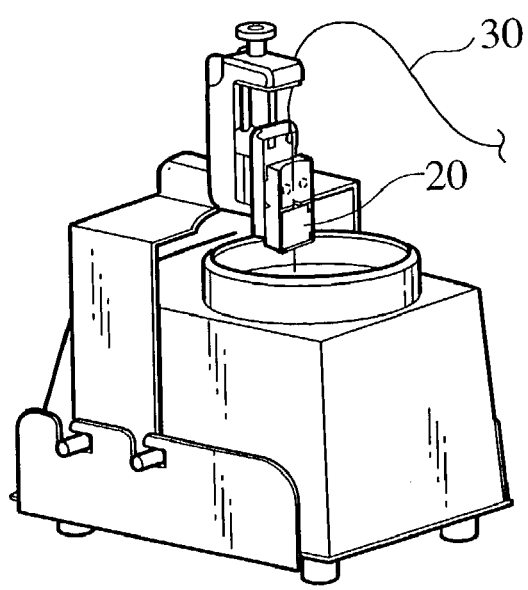

FIG. 15A and FIG. 15B are perspective views showing an ultrasonic cleaner device for cleaning the optical fiber whose coating material has been stripped. In FIG. 15A and FIG. 15B, a pair of the positioning protrusions 12 are formed on the mounting surface 11. Accordingly, when the optical fiber holder 20 is set in the positioning protrusions 12 formed in a feed mechanism 31 in the ultrasonic cleaner device as the optical fiber cleaner device, the optical fiber holder 20 is mounted. When the end portion of the optical fiber is set in vertical direction in order to perform the cleaning process, because the relationship in position between the feed mechanism 31 and the optical fiber holder 20 is always same, it is thereby possible to clean the end portion of the same length in the optical fiber. Accordingly, it is possible to always perform the cleaning process for the end portion of the predetermined length of the optical fiber 30 efficiently without changing of the cleaning range.

Figures 16A, 16B:
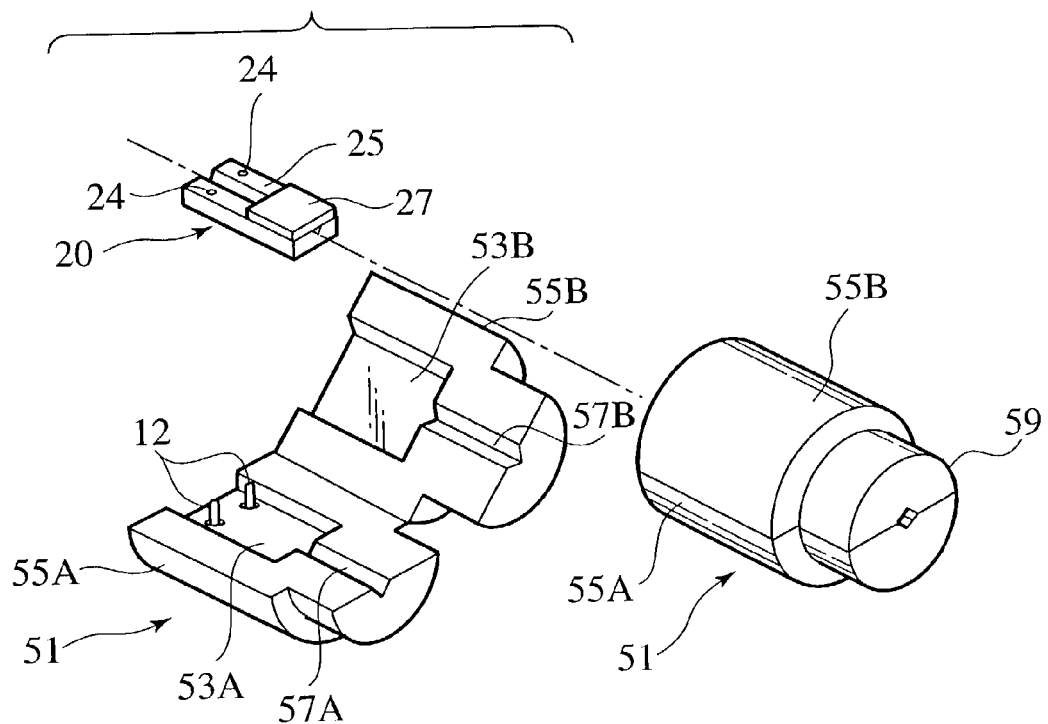
FIG. 16 is a perspective view showing a configuration of an adaptor for use in the setting of the optical fiber holder into a measuring device.

FIG. 16 is a perspective view showing an adaptor for use in the setting of the optical fiber holder into a measuring device such as a power meter and the like. As shown in FIG. 16, the adaptor 51 comprises an adaptor body 55A and a cover member 55B. The adaptor body 55A has containing sections 53A and 53B in which the optical fiber holder 20 holding the optical fiber is mounted and freely demounted.

At a predetermined position of the container 53A in the adaptor 55A a pair of positioning pins 12 are formed. The positioning pins 12 can be inserted into and detached from the hollow portions (holes) 24 in the optical fiber holder 20. In the adaptor body 55A and the cover member 55B, the containing sections 53A and 53B are formed. Holding grooves 57A and 57B are formed, which are connected through the containing sections 53A and 53B, respectively.

An engaging portion 59 corresponding to the measuring device (not shown) is formed in the adaptor 51 when the adaptor body 55A and the cover member 55B are closed to each other when the containing sections 53A and 53B and the holding grooves 57A and 57B are closed in opposition state.

Accordingly, when the positioning pins 12 formed in the adaptor body 55A are engaged with the positioning hollow portions (or through holes) 24 in the optical fiber holder 20 and when the optical fiber holder 20 is set in the containing section 53A while positioning the optical fiber holder 20 to the containing section 53A in the adaptor 51. The end portion of the optical fiber held by the optical fiber holder 20 can be positioned in the holding groove 57A. It is thereby possible to always keep the relationship of the positioning between the end surface of the optical fiber and the end surface of the adaptor 51 at a constant.

When the engaging portion 59 of the adaptor 51 is inserted into a hollow portion of the measuring device (not shown) after the optical fiber holder 20 is mounted and fixed in the adaptor 51 by closing the cover member 55B, it is possible to always set and connect the end portion of the optical fiber to the measuring device at the same position. It is thereby possible to always perform the measuring process stability.

By the way, the present invention is not limited by the configuration of the shape of the positioning protrusions formed in the mounting device in the optical fiber processing device on which the optical fiber holder is mounted. For example, it is acceptable to have the various shapes that will be explained below, as shown in FIG. 17 and FIG. 18.

Figure 17:
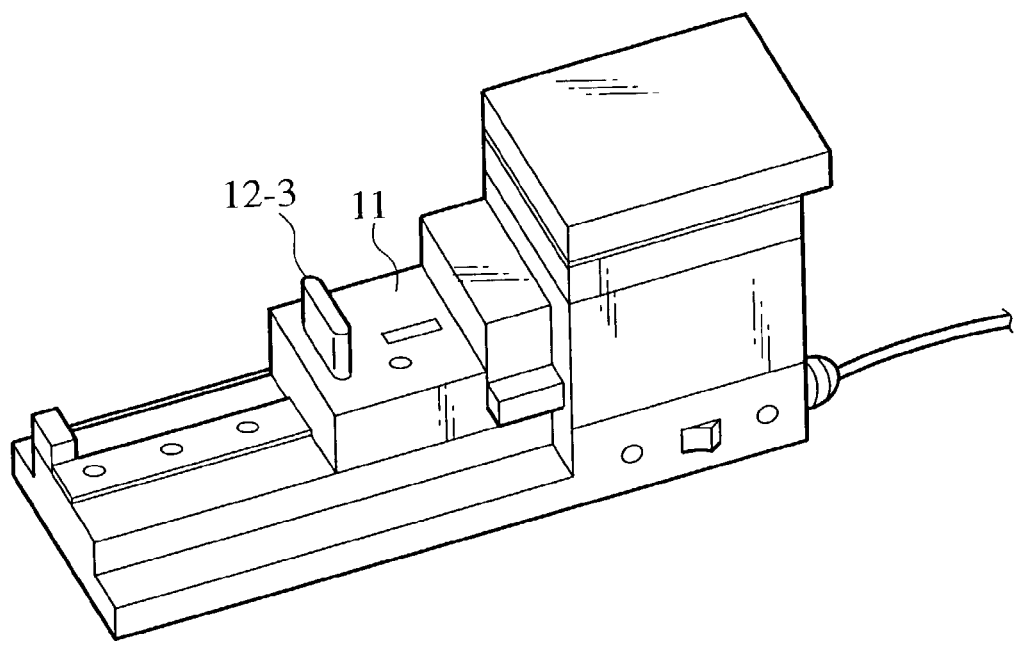
FIG. 17 is a perspective view showing the high strength jacket stripper having the mounting surface on which another-shaped positioning protrusion is formed.

FIG. 17 is a perspective view showing the high strength jacket stripper for stripping the coating material from the optical fiber. When compared with the shape of the positioning protrusions shown in FIG. 13, one positioning protrusion 12-3 is formed on the mounting surface 11 as shown in FIG. 17. The positioning protrusion 12-3 has the shape shown in FIG. 10E. By using this configuration of the positioning protrusion, it is possible to have the same effect.

Figure 18:
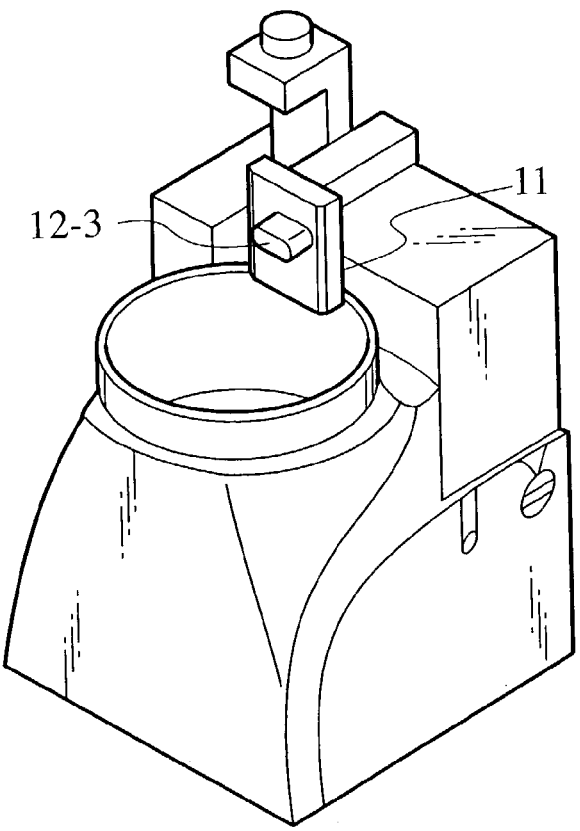
FIG. 18 is a perspective view showing the ultrasonic cleaning device having the mounting surface on which another-shaped positioning protrusion is formed.

FIG. 18 is a perspective view showing the ultrasonic cleaning device for cleaning the end portion of the optical fiber whose coating material has been stripped. When compared with the shape of the positioning protrusions shown in FIG. 15A and FIG. 15B, one positioning protrusion 12-3 is formed on the mounting surface 11 as shown in FIG. 18. The positioning protrusion 12-3 has the shape shown in FIG. 10E. By using this configuration of the positioning protrusion, it is possible to have the same effect.

It is acceptable to apply the optical fiber holders according to the present invention to various devices other than the optical fiber processing devices described above.

By the way, in the explanation of the first embodiment described above the hollow portions (or through holes) are formed in the back (or bottom) surface 21 of the optical fiber holder 20 and the positioning protrusions 12 are formed on the mounting surface 11 of the optical fiber processing device. The present invention is not limited by this configuration, for example, it is possible that the positioning protrusions 12 are formed at the back surface 21 of the optical fiber holder 20, and the hollow portions (or through holes) corresponding to those positioning protrusions are formed in the mounting surface of the optical fiber processing device. By using the configuration, it is also possible to have the same effect. In this configuration, because the mounting surface 11 in the optical fiber processing device becomes flat, the conventional optical fiber holders can be mounted on the optical fiber processing device.

Further, the explanation of the first embodiment described above shows that the number of the push plate 27 is one. The present invention is not limited by this configuration. For example, it is acceptable for the optical fiber holder to have a plurality of the push plates in the longitudinal direction of the optical fiber holder.

Still furthermore, the present invention is not limited by the shape of the hollow portions formed in the optical fiber holder described above. For example, it is possible to use through holes instead of the hollow portions. The case of the through holes can have the same effect.

In the explanation described above, the interval between the positioning protrusions formed on the mounting surface is the same as the interval of the inner surfaces 23 in the guiding rails 22 in the optical fiber holder 20. The present invention is not limited by this configuration. It is acceptable to form the positioning protrusions in a different interval when compared with the interval of the inner surfaces of the guiding rails in the optical fiber holder. For example, each positioning protrusion is formed according to the position of each hollow portion.

In addition, the distance L1 (see FIG. 4) between the push plate 27 and the upper surface of the base body 25 is determined according to the diameter of the optical fiber. When a plurality of optical fiber holders are formed according to the diameters of various optical fibers, it is possible to apply the optical fiber holders to many kinds of optical fibers. However, each optical fiber holder of the present invention is formed so that the distance between the mounting surface 11 and the center of the core of the optical fiber 30 becomes a constant value when the optical fiber 30 is set in the V-grooves 28.

Second Embodiment

The optical fiber holder 20 according to the first embodiment described above clamps one optical fiber. The present invention is not limited by this configuration, for example, the optical fiber holder of the present invention can be applied to an optical fiber ribbon. In this application, the optical fiber holder clamps an optical fiber ribbon made up of a plurality of optical fibers arranged in parallel.

Hereinafter, a description will be given of the explanation for the optical fiber holder for holding and clamping the optical fiber ribbon.

Figure 19:
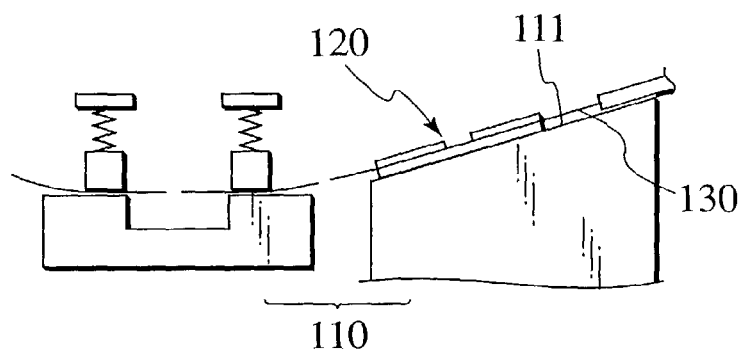
FIG. 19 is a front view showing a state in which an optical fiber holder of a second embodiment of the present invention is mounted on the optical fiber processing device.
Figure 20:
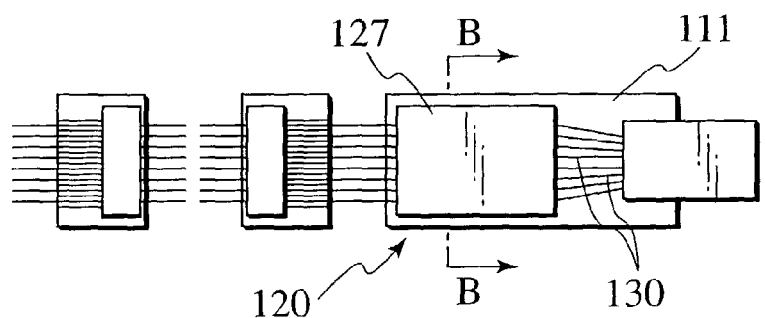
FIG. 20 is a plan view showing the optical fiber processing device on which the optical fiber holder of the second embodiment of the present invention is mounted.
Figure 21:
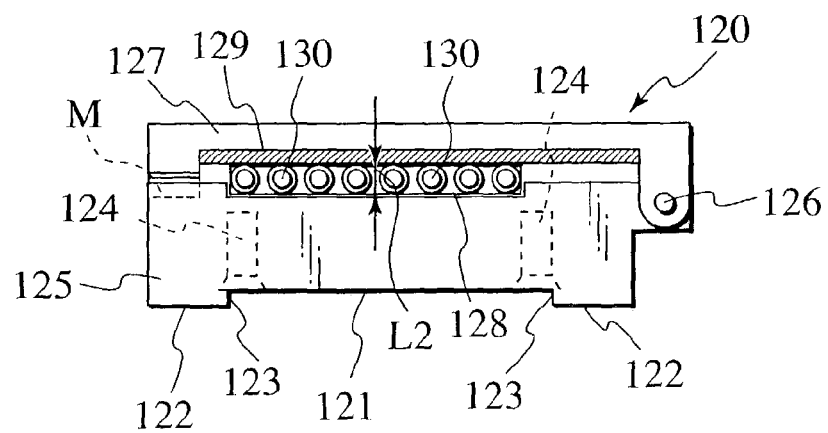
FIG. 21 is an enlarged view of B-B line in the optical fiber holder shown in FIG. 20.
Figure 22:
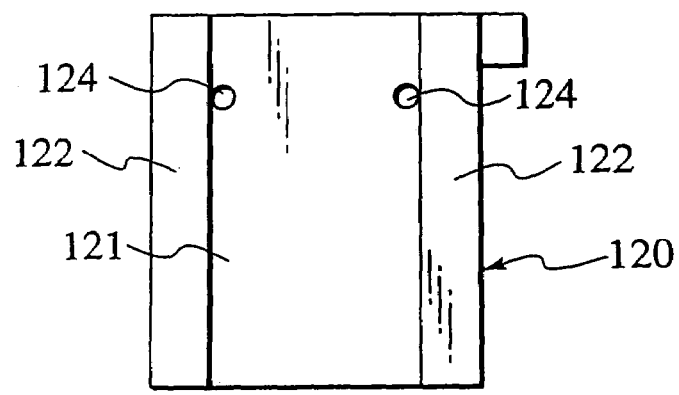
FIG. 22 is a bottom view of the optical fiber holder according to the second embodiment.
Figure 23:
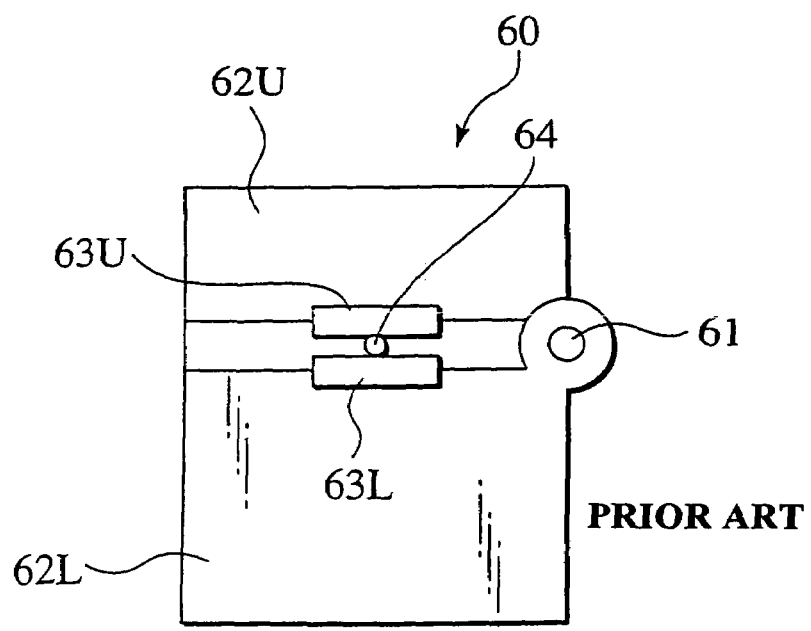
FIG. 23 is a front view showing a configuration of a conventional optical fiber holder.
Figure 24:
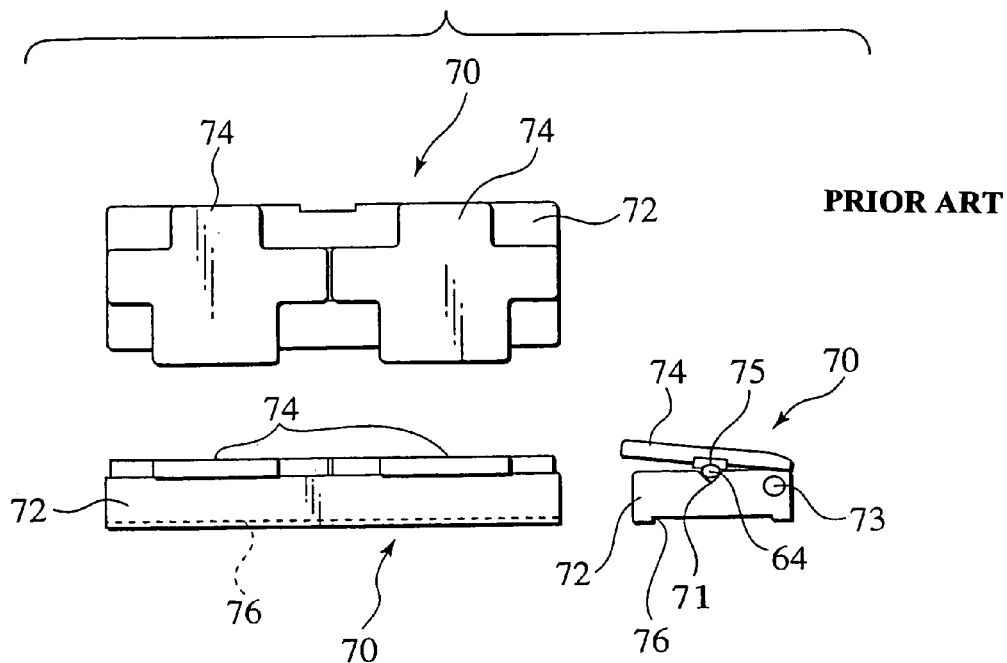
FIG. 24 is a view showing a configuration of a conventional optical fiber holder.
Figure 25A:
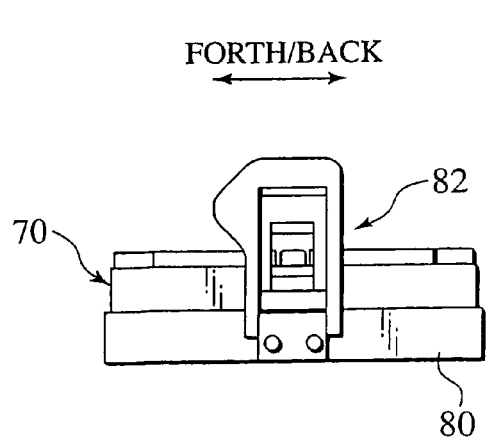
FIG. 25A and FIG. 25B are diagrams showing an explanation of a configuration for fixing an optical fiber holder.
Figure 25B:
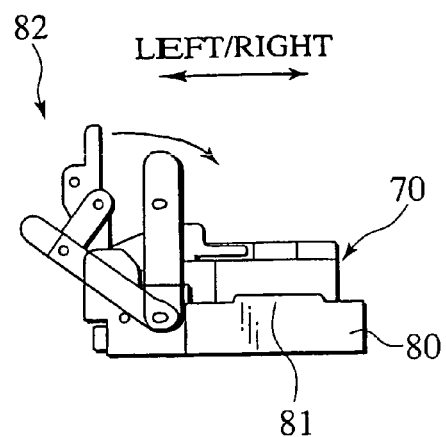

FIG. 19 is a front view showing the optical fiber processing device on which the optical fiber holder according to the second embodiment of the present invention is mounted. FIG. 20 is a plan view showing the state of the optical fiber processing device on which the optical fiber holder of the second embodiment of the present invention is mounted. FIG. 21 is an enlarged view of B-B line in the optical fiber holder shown in FIG. 20. FIG. 22 is a bottom view of the optical fiber holder according to the second embodiment.

As shown in FIG. 19 to FIG. 21, the optical fiber ribbon comprises a plurality of optical fibers arranged in parallel and bundled. The optical fiber holder 120 of the present invention can clamp the optical fiber ribbon to be processed by the optical fiber processing device.

Like the optical fiber holder of the first embodiment, the optical fiber holder 120 of the second embodiment comprises a base block 125 and a push plate 127. The entire shape of the base block 125 is nearly a rectangular shape. The push plate 127 is freely open and closed against the front surface of the base block 125 through a hinge pin 126 and pushes the surface of the base block 125.

A part or the entire of this push plate 127 comprises a magnetic material and fixed to the base block 125 through the hinge pin 126 and the push plate 127 is opened and closed freely through this hinge pin 126. Furthermore, a pair of magnets M (see FIG. 21) are embedded in the base block 125 and the surface of each magnet M is exposed. Accordingly, when the push plate 127 is closed, the inner surface of the push plate 127 is magnetically attracted to the magnets M in the base block 125.

On the surface of the base block 125, a groove 128 is formed. The length of the groove is made corresponding to the length of the optical fiber ribbon made up of a plurality of optical fibers arranged in parallel. On the groove 128, the optical fiber ribbon to be processed by the optical fiber processing device is set.

As shown in FIG. 21, a pair of the magnets M are embedded in the surfaces of the edge portions of the base block 125 and the surface of each magnet M is exposed. A pair of the magnets M are arranged at a location corresponding in position to the magnetic material in the push plate 127 when the push plate 127 is closed. Accordingly, when the optical fiber ribbon 130 is mounted in the groove 128 and the push plate 127 is closed, the optical fiber ribbon 130 is held by magnetically attracting the magnets M in the base block 125 to the inner surface of the push plate 127. In order to protect the optical fiber ribbon 130 when the push plate 27 is closed, a rubber sheet 129 is placed at the inside of the push plate 127.

As shown in FIG. 22, guiding rails 122 of a convex shape are formed at both the edge portions of the base block 125 in its longitudinal direction in the back surface (or bottom surface) 121 of the base block 125 forming the optical fiber holder 120. Through the guiding rails 122, the positioning protrusions (or positioning pins) 112 (see FIG. 6) are guided. The positioning protrusions 112 are formed on the mounting surface 111 of the optical fiber processing device 101.

In this back surface 121 of the base block 125 a pair of hollow portions 124 (or through holes are also acceptable instead of the hollow portions) are formed corresponding to a pair of the positioning protrusions 112. The entry portion of each hollow portion 124 is a taper shape for easily guiding the corresponding protrusion 112 (see FIG. 21).

On the other hand, on the mounting surface 111 of the optical fiber processing device on which the optical fiber holder 120 is mounted, a pair of the positioning protrusions 112 are formed, like the case of the first embodiment. A pair of the positioning protrusions 112 correspond in position to a pair of the hollow portions 124 (see FIG. 6).

The interval between a pair of the positioning protrusions 112 corresponds to the interval between the inner sidewalls 123 of the guiding rails 122 in the optical fiber holder 120. Further, the positioning protrusions 112 correspond in position to the hollow portions 124. The positioning protrusions 112 are formed in a symmetric position to the centerline of the base block 125 in its longitudinal direction.

When the optical fiber holder 120 is mounted in the mounting surface 111 of the optical fiber processing device 110, a pair of the positioning protrusions 112 are contacted and pushed to the inner sidewalls 123 in the guiding rails 122 opposed to each other, the optical fiber holder 120 is shifted along the inner sidewalls 123, and the positioning protrusions 112 are thereby completely inserted into the corresponding hollow portions 124.

Like the case of the first embodiment, there are the optical fiber processing devices on which the optical fiber holder is mounted, as shown in FIG. 10 to FIG. 18. The present invention is not limited by those cases. The optical fiber holder of the present invention can be applied to various devices other than the optical fiber processing devices described above.

When the positioning protrusions 112 are inserted into the hollow portions 124, the optical fiber holder 120 is tightly fixed at the predetermined position on the mounting surface 111 of the optical fiber processing device 110.

Like the case of the first embodiment, it is possible to form the shape of the positioning protrusions based on the following shapes. The tip of the positioning protrusion (pin) has a hemispherical shape (see FIG. 10A) or a plane shape (see FIG. 10B). The entire of the tip of the positioning protrusion (pin) has a hemispherical shape (see FIG. 10C) or a triangle pole shape (see FIG. 10D). The sectional shape of the tip of the positioning protrusion has an ellipsoid shape (see FIG. 10E) or a rectangular column shape (see FIG. 10F), or it has a triangular pyramid shape (see FIG. 10G). It is possible for the positioning protrusion to have various shapes other than the shapes described above.

By the way, the present invention is not limited by the above configuration in which the number of the hollow portions (or through holes) 124 corresponding to the positioning protrusions 112 is a pair. For example, it is acceptable that the number thereof is one, or an optional number of more than two. However, in the case that the number is one it is necessary for the sectional shape of the positioning protrusion to have the ellipsoid shape (see FIG. 10E) or the rectangular column shape (see FIG. 10F).

For example, as shown in FIG. 8, when the mounting surface 111-1 of the optical fiber processing device 110-1 has a slope of a predetermined angle, the positioning protrusions 112-1 are formed so that they have the same slope according to the slope of the mounting surface 111-1 and the hollow portions of the optical fiber holder has the same slope described above. By the configuration described above, it is possible to easily mount and demount the optical fiber holder 120-1. It is desirable that the slope angle against the mounting surface 111-1 is in a range of 30 to 90 angles.

By the way, in the explanation of the second embodiment described above the hollow portions (or through holes) are formed in the back (or bottom) surface 121 of the optical fiber holder 120 and the positioning protrusions 112 are formed on the mounting surface 111 of the optical fiber processing device. The present invention is not limited by this configuration, for example, it is possible that the positioning protrusions 112 are formed at the back surface 121 of the optical fiber holder 120, and the hollow portions (or through holes) corresponding to those positioning protrusions are formed in the mounting surface of the optical fiber processing device. By using this configuration, it is also possible to have the same effect. In this configuration, because the mounting surface 111 in the optical fiber processing device becomes flat, the conventional optical fiber holders can be mounted on the optical fiber processing device.

Further, the explanation of the second embodiment described above shows that the number of the push plate 127 is one. The present invention is not limited by this configuration. For example, it is acceptable for the optical fiber holder to have a plurality of the push plates in the longitudinal direction of the optical fiber holder in which the optical fiber ribbon is clamped.

Still furthermore, the present invention is not limited by the shape of the hollow portions formed in the optical fiber holder described above. For example, it is possible to use through holes instead of the hollow portions. The case to use the through holes can have the same effect.

In the explanation of the second embodiment described above, the interval between the positioning protrusions formed on the mounting surface is the same as the interval of the inner surfaces 123 in the guiding rails 122 in the optical fiber holder 120. The present invention is not limited by this configuration. It is acceptable to form the positioning protrusions in a different interval when compared with the interval of the inner surfaces of the guiding rails in the optical fiber holder. For example, each positioning protrusion is formed on the mounting surface of the optical fiber processing device according to the position of each hollow portion.

In addition, the distance L2 (see FIG. 21) between the push plate 127 and the upper surface of the base body 125 is determined according to the thickness of the optical fiber ribbon. When a plurality of optical fiber holders are formed according to the thickness of various optical fiber ribbons, it is possible to apply the optical fiber holders to many kinds of optical fiber ribbons. However, each optical fiber holder of the present invention is formed so that the distance between the mounting surface 111 and the center of the core of the optical fiber ribbon 130 becomes a constant value when the optical fiber ribbon 130 is set in the grooves 128.

As described above, according to the optical fiber holders and the optical fiber processing devices having the positioning mechanism, the front-end portion of each positioning protrusion on the mounting surface is contacted to the guiding rails formed on the back surface of he optical fiber holder and the optical fiber is shifted in parallel to the mounting surface to the predetermined position. The head portion of each positioning protrusion is thereby contacted to the inner surface of the guiding rail of the optical fiber holder and reached to the hollow portions. Thus, the positioning protrusions are inserted into the hollow portions and the optical fiber holder is thereby fixed tightly on the mounting surface of the optical fiber processing device.

As set forth in detail, according to the optical fiber holders and the optical fiber processing devices having the positioning mechanism of the present invention, because the optical fiber holder is mounted on the mounting surface of the optical fiber processing device while the holder is kept at a desired height measured from the mounting surface through the positioning protrusions, it is possible to avoid that the cleave surface or the side surfaces of the optical fiber touch or come into collision with component parts of the optical fiber processing device around the holder. Therefore the present invention has the effect to decrease the splice loss when the optical fibers are spliced because it is possible to avoid any occurrence of flaws and cracks on the surfaces and the cleave surfaces of the optical fibers and to avoid any adherence of dusts onto the optical fibers.

Furthermore, by using the optical fiber holder according to the present invention, it is not necessary to use any additional fixing means to fix the optical fiber and the optical fiber ribbon on the optical fiber processing device. Accordingly, the present invention has the effect that it is possible to easily and accurately mount the optical fiber and the optical fiber ribbon in the optical fiber processing device.

Further, in the case that the optical fiber is set in the optical fiber processing device such as a terminal processing devices and measuring devices while the optical fiber holder holds the optical fiber, because the positional protrusions are inserted into and engaged with the hollow portions (or through holes) in positioning, the optical fiber is always set in a constant position. Thus, it is possible to mount the optical fiber in the optical fiber processing device accurately and easily.

All these and other modifications and alterations of the illustrated embodiments within the common knowledge of the specialists are intended in the foregoing disclosure. It is therefore appropriate that the invention be construed broadly and in a manner consistent with the fair meaning or proper scope of the subjoined claims.

What is claimed is:

1. An optical fiber holder for clamping an optical fiber, comprising:
    a base body having,
        a top portion for clamping the optical fiber and
        at least one hole portion provided on a bottom portion of the base body and configured to engage with at least one positioning protrusion formed on a mounting surface of an optical fiber processing device.

2. The optical fiber holder according to claim 1, further comprising at least one guiding rail configured to guide the at least one positioning protrusion formed on the mounting surface of the optical fiber processing device.

3. The optical fiber holder according to claim 2, further comprising at least one push plate connected to the base body,
    wherein the base body has at least one V-groove configured to receive one optical fiber and a groove configured to receive an optical fiber ribbon made up of a plurality of optical fibers, and
    the at least one push plate pushes the optical fiber and the optical fiber ribbon, and is freely open and closed.

4. The optical fiber holder according to claim 3, wherein the base body comprises a magnet for clamping the optical fiber, and the at least one push plate comprises a magnetic material formed at a position corresponding to a position of the magnet in the base body, wherein the at least one push plate and the base body are magnetically attracted to each other when the at least one push plate is closed in order to clamp the optical fiber.

5. The optical fiber holder according to claim 4, wherein the at least one push plate has a rubber plate disposed on a portion where the optical fiber is contacted, in order to protect the optical fiber.

6. The optical fiber holder according to claim 2, wherein the at least one guiding rail comprises projection portions formed at both edge portions of a back surface of the optical fiber holder.

7. The optical fiber holder according to claim 6, wherein the at least one hole portion comprises a plurality of hole portions formed at positions between the projection portions.

8. The optical fiber holder according to claim 3, wherein the at least one push plate comprises a plurality of push plates.

9. The optical fiber holder according to claim 1, wherein the at least one hole portion comprises at least one of a through hole and a hollow portion.

10. The optical fiber holder according to claim 1, wherein the at least one hole portion comprises a plurality of hole portions, the at least one positioning protrusion comprises a plurality of positioning protrusions, and the number of the hole portions corresponds to the number of the positioning protrusions.

11. The optical fiber holder according to claim 1, wherein a slope of the at least one hole portion with respect to the surface of the optical fiber holder is in a range of 30 to 90 degree angles, and the at least one hole portion is formed according to a slope of the at least one positioning protrusion formed on the mounting surface of the optical fiber processing device.

12. An optical fiber processing device on which an optical fiber holder clamping configured to clamp an optical fiber is mounted for processing the optical fiber, comprising a mounting surface on which the at least one positioning protrusion is formed, wherein the at least one positioning protrusion corresponds in position to a position of the at least one hole portion formed in the optical fiber holder according to any one of claims 1 to 8.

13. The optical fiber processing device according to claim 12, further comprising guiding rails configured to guide both edge portions of the optical fiber holder.

14. The optical fiber processing device according to claim 12, further comprising a stopper configured to stop a front end portion of the optical fiber holder.

15. An optical fiber holder for clamping an optical fiber, comprising:
   a base body including,
   a top portion for clamping the optical fiber and
      at least one hole portion provided on a bottom of the base body and configured to engage with a mounting surface of an optical fiber processing device having positioning protrusions formed at locations corresponding to the hole portions,
   wherein the hole portions have inclined surfaces with respect to the surface of the optical fiber holder, and the hole portions are formed so as to engage with the positioning protrusions formed at an acute angle on the optical fiber holder.

* * * * *